(12) United States Patent
Bybell et al.

(10) Patent No.: US 8,140,831 B2
(45) Date of Patent: Mar. 20, 2012

(54) ROUTING INSTRUCTIONS IN A PROCESSOR

(75) Inventors: Anthony J. Bybell, Carrboro, NC (US); Kenichi Tsuchiya, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 12/412,889

(22) Filed: Mar. 27, 2009

(65) Prior Publication Data
US 2010/0250905 A1 Sep. 30, 2010

(51) Int. Cl.
G06F 9/38 (2006.01)
G06F 9/40 (2006.01)
G06F 15/76 (2006.01)

(52) U.S. Cl. .................................... 712/215; 712/23
(58) Field of Classification Search ............ 712/23, 712/215
See application file for complete search history.

(56) References Cited

U.S. PATENT DOCUMENTS

| | | | | |
|---|---|---|---|---|
| 5,640,588 A * | 6/1997 | Vegesna et al. | ............... | 712/23 |
| 5,668,985 A | 9/1997 | Carbine et al. | | |
| 5,847,954 A | 12/1998 | Beard et al. | | |
| 6,023,756 A * | 2/2000 | Okamura | ............... | 712/208 |
| 6,112,019 A | 8/2000 | Chamdani et al. | | |
| 6,240,507 B1 * | 5/2001 | Derrick et al. | ............... | 712/217 |
| 6,247,114 B1 | 6/2001 | Trull | | |
| 7,302,553 B2 | 11/2007 | Chu et al. | | |
| 2008/0270749 A1 | 10/2008 | Ozer | | |
| 2009/0259830 A1 * | 10/2009 | Indukuru et al. | ............... | 712/227 |

OTHER PUBLICATIONS

Bunchua et al., Reducing Operand Transport Complexity of Superscalar Processors Using Distributed Register Files, Proceedings of the 21st international Conference on Computer Design (ICCD'03), IEEE.

* cited by examiner

*Primary Examiner* — Daniel Pan
(74) *Attorney, Agent, or Firm* — Yudell Isidore Ng Russell PLLC

(57) ABSTRACT

Disclosed are a method and system for reducing complexity of routing of instructions from an instruction issue queue to appropriate execution pipelines in a superscalar processor. In one or more embodiments, an instruction steering unit of the superscalar processor receives ordered instructions. The steering unit determines that a first instruction and a subsequent second instruction of the ordered instructions are non-branching instructions, and the steering unit stores the first and second instructions in two non-branching instruction issue queue entries of a shadow queue. The steering unit determines whether or not a third instruction the ordered instructions is a branch instruction, where the third instruction is subsequent to the second instruction. If the third instruction is a branch instruction, the steering unit stores the third instruction in a branch entry of the shadow queue; otherwise, the steering unit stores a no operation instruction in the branch entry of the shadow queue.

19 Claims, 5 Drawing Sheets

ROUTING INSTRUCTIONS IN A PROCESSOR

BACKGROUND

1. Technical Field

The present invention generally relates to routing of processor instructions to appropriate execution pipelines in a superscalar processor. More specifically, the present invention relates to reducing complexity of routing of processor instructions to appropriate execution pipelines in a superscalar processor.

2. Description of the Related Art

Instruction level parallelism and superscalar processing can benefit by using an instruction issue queue that can be used dynamically schedule instructions for execution. However, as the number of instructions dispatched to execution units or execution pipelines of a superscalar processor in a clock cycle increases, equations governing routing of which instruction issue queue entry goes to what execution pipeline of the superscalar processor becomes complex. In addition, hazard detection logic must also scan over a greater number of instruction issue queue entries, and this increased scanning can lengthen an amount of time for each clock cycle which can decrease performance of the superscalar processor. These issues are typified in a portion of a conventional super scalar processor illustrated in FIG. 1.

With reference now to FIG. 1, there is depicted a block diagram representation of a portion of a prior art conventional super scalar processor (SSP) 100. Conventional SSP 100 includes an instruction issue queue (IIQ) 110. As shown, IIQ 110 includes IIQ entries 120D0-120D7. Instruction lines 130LN0-130LN7 coupled to and populate respective IIQ entries 120D0-120D7. Populating IIQ 110 starts at IIQ entry 120D0 and continues towards IIQ entry 120D7. Thus, the oldest processor instruction resides in IIQ entry 120D0, a newer processor instruction resides IIQ entry 120D1, and so on. In various designs and/or implementations, an IIQ can include various numbers of IIQ entries.

Conventional SSP 100 includes execution pipelines 140PI, 140PJ, and 140PB coupled to IIQ entries 120D0-120D2. Execution pipeline 140PB executes branch instructions, and execution pipelines 140PI and 140PJ execute non-branch instructions, e.g., integer instructions, floating point instructions, etc. In various designs and/or implementations, a SSP can include various numbers pipelines. As shown, a processor instruction in each of IIQ entries 120D0-120D2 can be routed to each of execution pipelines 140PI, 140PJ, and 140PB, with branch processor instructions routing to execution pipeline 140PB and non-branch processor instructions routing to execution pipelines 140PI and 140PJ.

Since processor instructions residing in IIQ entries 120D0-120D2 are unknown for any clock cycle, there are nine possible routes in routing processor instructions from IIQ entries 120D0-120D2 to execution pipelines 140PI, 140PJ, and 140PB. In some implementations, timing considerations may dictate a late select of three full decoders. For example, an amount of time transpiring for a clock cycle may need to be increased which results in slower processing of processor instructions and, thus, decreased performance. Furthermore, since processor instructions residing in IIQ entries 120D0-120D2 are unknown for any given clock cycle, three possible hazards are to be determined and arbitrated if necessary. A possible hazard can include a read after write (RAW) hazard, a write after write (WAW) hazard, or a write after read (WAR) hazard. For example, a possible hazard to be determined whether or not to exist (and arbitrated if necessary) occurs with IIQ entry 120D2 and IIQ entries 120D1 and 120D0, and a possible hazard to be determined whether or not to exist (and arbitrated if necessary) occurs with IIQ entry 120D1 and IIQ entry 120D0.

SUMMARY OF ILLUSTRATIVE EMBODIMENTS

Disclosed are a method and a system for reducing complexity of routing of processor instructions from an instruction issue queue to appropriate execution pipelines in a superscalar processor. In one or more embodiments, an instruction steering unit of the superscalar processor receives ordered instructions that pass into instruction issue queue entries of a first instruction issue queue of the superscalar processor. The steering unit determines that at least a first instruction and a second instruction of the ordered instructions are non-branching instructions, where the second instruction is subsequent to the first instruction, and the steering unit stores the first instruction and the second instruction into two non-branching instruction issue queue entries of a second instruction issue queue of the superscalar processor. The steering unit determines whether or not a third instruction of the ordered instructions is a branch instruction, where the third instruction is subsequent to the second instruction. If the third instruction is a branch instruction, the steering unit stores the third instruction into a branch entry of the second instruction issue queue; otherwise, the steering unit stores a no operation (NOP) instruction into the branch entry of the second instruction issue queue. The execution pipelines of the superscalar processor receive the instructions from the second instruction issue queue.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF ILLUSTRATIVE EMBODIMENTS

Figure 1:
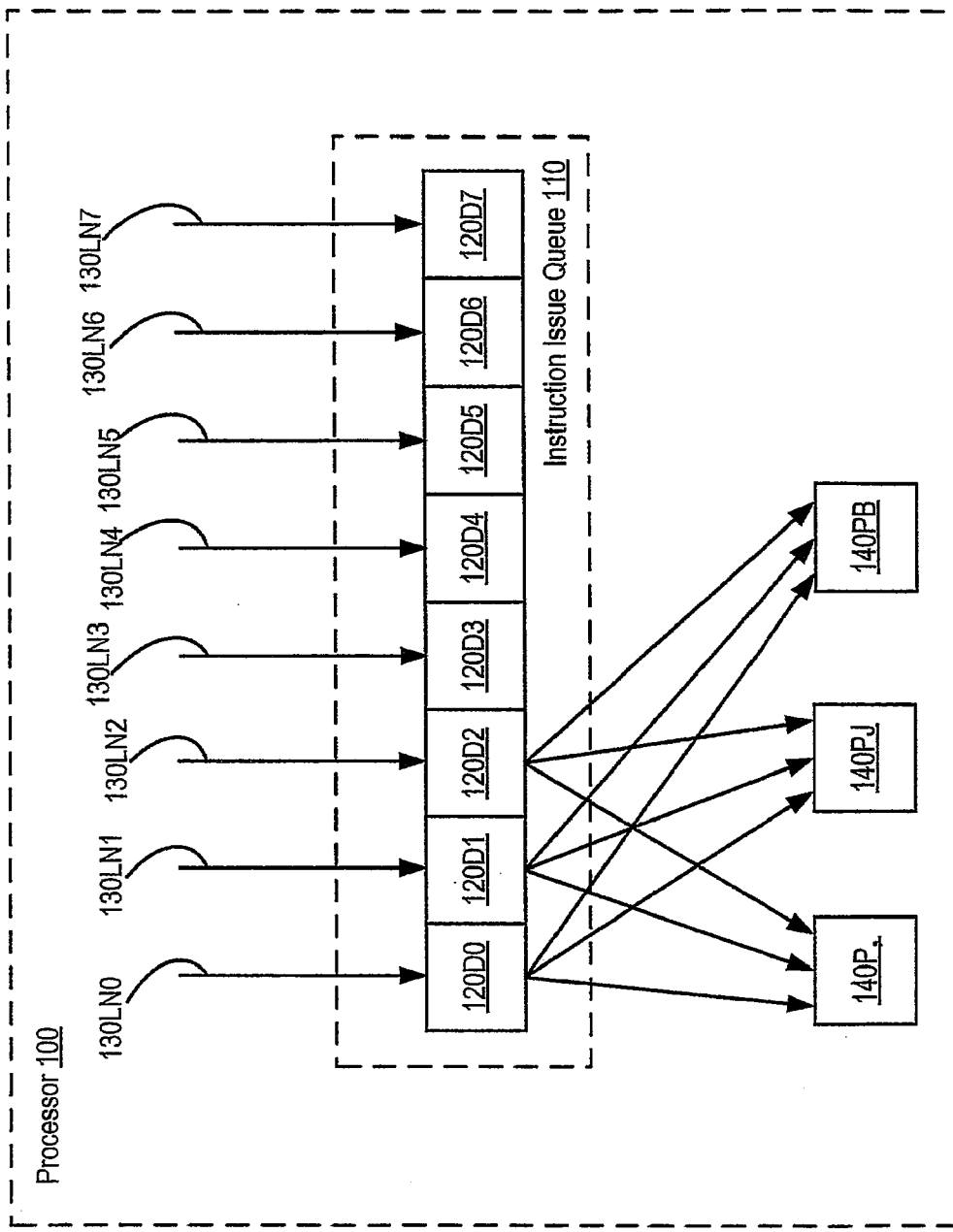
FIG. 1 illustrates a block diagram of a portion of a conventional prior art processor.

Disclosed are a method and a system for reducing complexity of routing of processor instructions from an instruction issue queue to appropriate execution pipelines in a superscalar processor. In one or more embodiments, an instruction steering unit of the superscalar processor receives ordered instructions that pass into instruction issue queue entries of a first instruction issue queue of the superscalar processor. The steering unit determines that at least a first instruction and a second instruction of the ordered instructions are non-branching instructions, where the second instruction is subsequent to the first instruction, and the steering unit stores the first instruction and the second instruction into two non-branching instruction issue queue entries of a second instruction issue queue of the superscalar processor. The steering unit determines whether or not a third instruction of the ordered instructions is a branch instruction, where the third instruction is subsequent to the second instruction. If the third instruction is a branch instruction, the steering unit stores the third instruction into a branch entry of the second instruction issue queue; otherwise, the steering unit stores a no operation (NOP) instruction into the branch entry of the second instruction issue queue. The execution pipelines of the superscalar processor receive the instructions from the second instruction issue queue.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the process(es)/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 2:
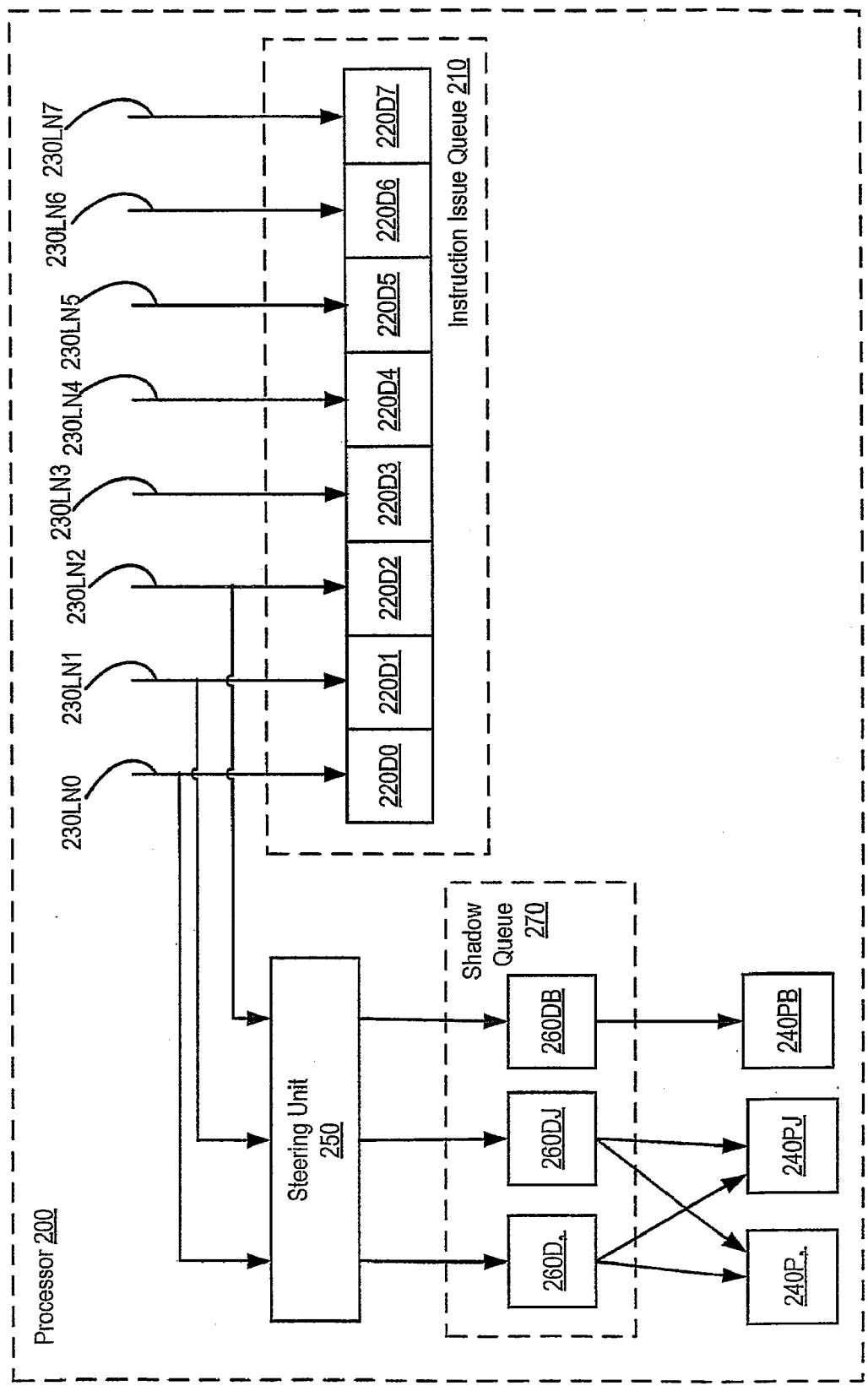
FIG. 2 illustrates an exemplary block diagram of a portion of a processor with a steering unit and a shadow queue, according to one or more embodiments.

With reference now to FIG. 2, there is depicted a block diagram representation of a portion of a super scalar processor (SSP) with a steering unit and a shadow queue. As shown, a SSP 200 includes an instruction issue queue (IIQ) 210, and IIQ 210 can include IIQ entries 220D0-220D7. In one or more embodiments, IIQ entries 220D0-220D7 are implemented as hardware queue entries. SSP 200 includes instruction lines 230LN0-230LN7 coupled to and populate respective IIQ entries 220D0-220D7. Populating IIQ 210 starts at IIQ entry 220D0 and continues towards IIQ entry 220D7. Thus, the "oldest" processor instruction resides in IIQ entry 220D0, a "newer" processor instruction resides IIQ entry 220D1, and so on. In other words, processor instructions can be sequenced or ordered such that a first processor instruction in a sequence placed in IIQ entry 220D0 can be considered the "oldest" instruction and such that a subsequent or second instruction of the sequence placed in IIQ entry 220D1 can be considered the a "newer" instruction.

In one or more embodiments, two or more processor instructions of the instruction sequence can be executed in different orders and/or simultaneously (e.g., in parallel) such that executing the two or more sequenced instructions in different orders and/or simultaneously does not affect a data flow or one or more results that would occur if the sequence were executed in original sequence order. In various designs and/or implementations, IIQ 210 can include various numbers of IIQ entries.

As shown, SSP 200 includes a steering unit 250 is coupled to 230LN0-230LN2 and is coupled to shadow queue entries 260DI, 260DJ, and 260DB of a shadow queue 270. In one or more embodiments, shadow queue 270 is considered an instruction issue queue. Shadow queue entries 260DI and 260DJ are coupled to execution pipelines 240PI and 240PJ, and shadow queue entry 260DB is coupled to execution pipeline 240PB. Execution pipeline 240PB executes branch instructions, and execution pipelines 240PI and 240PJ execute non-branch instructions, e.g., integer instructions, floating point instructions, etc. In one or more embodiments, execution pipelines 240PI and 240PJ are symmetric, and thus, an instruction that can be processed by execution pipeline 240PI can be processed by execution pipeline 240PI and vice versa. As shown, a processor instruction in each of shadow queue entries 260DI and 260DJ can be steered or routed to each of execution pipelines 240PI and 240PJ. In various designs and/or implementations, SSP 200 can include various numbers of execution pipelines. In one or more embodiments, shadow queue entries 260DI, 260DJ, and 260DB are implemented as hardware queue entries.

Since processor instructions residing in shadow queue entries 260DI and 260DJ are unknown for any given clock cycle, there are four possible routes in routing processor instructions from shadow queue entries 260DI and 260DJ to execution pipelines 240PI and 240PJ. A fifth route is a static route that routes shadow queue entry 260DB to execution pipeline 240PB. Because of this reduction is possible routes, less logic can be used in implementing dynamic routing of instructions from shadow queue entries 260DI and 260DJ to execution pipelines 240PI and 240PJ of SSP 200, in one or more embodiments, compared to logic used in implementing dynamic routing of instructions from instructions from IIQ entries 120D0-120D2 to execution pipelines 140PI, 140PJ, and 140PB of SSP 100. Moreover, using steering unit 250 and shadow queue 270, a number of hazard determinations can be reduced. More specifically, only one hazard determination, and possible arbitration, with shadow queue entry 260DJ and shadow queue entry 260DI is necessary.

Figure 3:
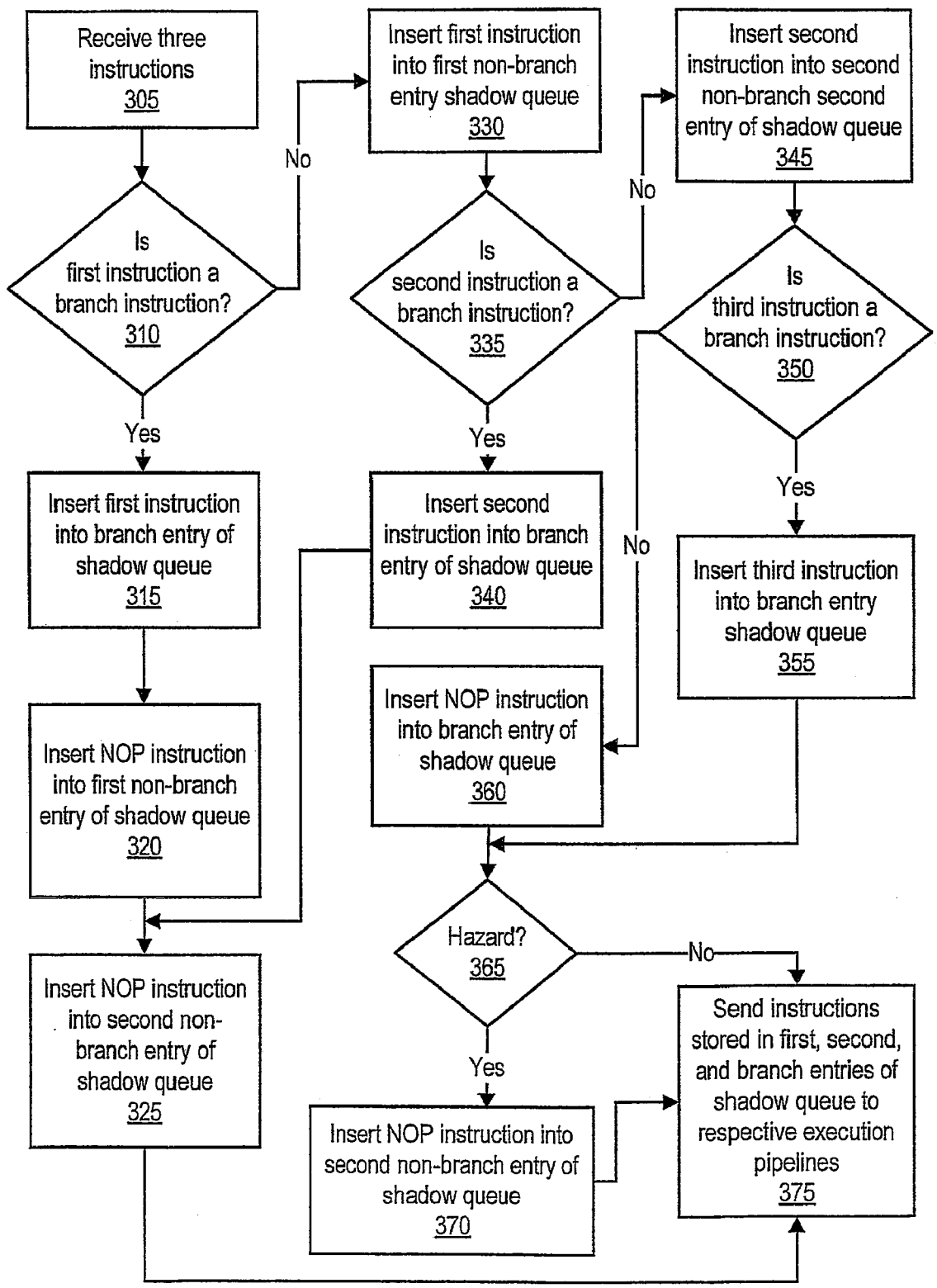
FIG. 3 illustrates a method for operating a superscalar processor, according to one or more embodiments.

Turning now to FIG. 3, a method for operating a superscalar processor is illustrated, according to one or more embodiments. Although the method illustrated in FIG. 3 may be described with reference to components shown in FIG. 2, it should be understood that this is merely for convenience and alternative components and/or configurations thereof can be employed with implementing one or more methods. In one or more embodiments, one or more portions of the method illustrated in FIG. 3 can be completed by microcode, one or more application-specific integrated circuits, and/or multiple logic gates.

The method of FIG. 3 begins at block 305 where steering unit 250 receives three ordered instructions. The first, second, and third instructions of the three instructions correspond to the instructions stored in IIQ entry 220D0-220D2, respectively. In one or more embodiments, steering unit 250 receives first, second, and third ordered instructions from instruction lines 230LN0-230LN2, respectively. At block 310 steering unit 250 determines whether or not the first instruction is a branch instruction. If the first instruction is a branch instruction, steering unit 250 proceeds to block 315 and stores the first instruction into shadow queue entry 260DB. At block 320, steering unit 250 stores a no operation (NOP) instruction into shadow queue entry 260DI, and at block 325, steering unit 250 stores a NOP instruction into shadow queue entry 260DJ. At block 375, processor 200 the instructions stored in shadow queue entries 260DI, 260DJ, and 260DB to respective execution pipelines 240PI, 240PJ, and 240PB. In one or more embodiments, execution pipelines 240PI and 240PJ are symmetric (e.g., interchangeable), and processor 200 sends shadow queue entry to 260DB to execution pipeline 240PB and sends shadow queue entries 260DI and 260DJ to execution pipelines 240PI and 240PJ, respectively, or shadow queue entries 260DI and 260DJ to execution pipelines 240PJ and 240PI, respectively.

If the first instruction is not a branch instruction, steering unit 250 proceeds to block 330 and stores the first instruction into shadow queue entry 260DI. At block 335, steering unit 250 determines whether or not the second instruction is a branch instruction. If the second instruction is a branch instruction, steering unit 250 stores the second instruction into shadow queue entry 260DB and proceeds to block 325. If the second instruction is not a branch instruction, steering unit 250 proceeds to block 345 and stores the second instruction into shadow queue entry 260DJ. At block 350, steering unit 250 determines whether or not the third instruction is a branch instruction. If the third instruction is a branch instruction, steering unit 250 stores the third instruction into shadow queue entry 260DB. If the third instruction is not a branch instruction, steering unit 250 stores a NOP instruction into shadow queue entry 260DB.

At block 365, steering unit 250 determines whether or not a hazard exists between instructions stored in shadow queue entries 260DI and 260DJ. If a hazard exists between the instructions stored in shadow queue entries 260DI and 260DJ, steering unit 250 proceeds to block 370 and stores a NOP instruction into shadow queue entry 260DJ, and the method proceeds to block 375. If a hazard does not exist between the instructions stored in shadow queue entries 260DI and 260DJ, the method proceeds to block 375.

Figure 4:
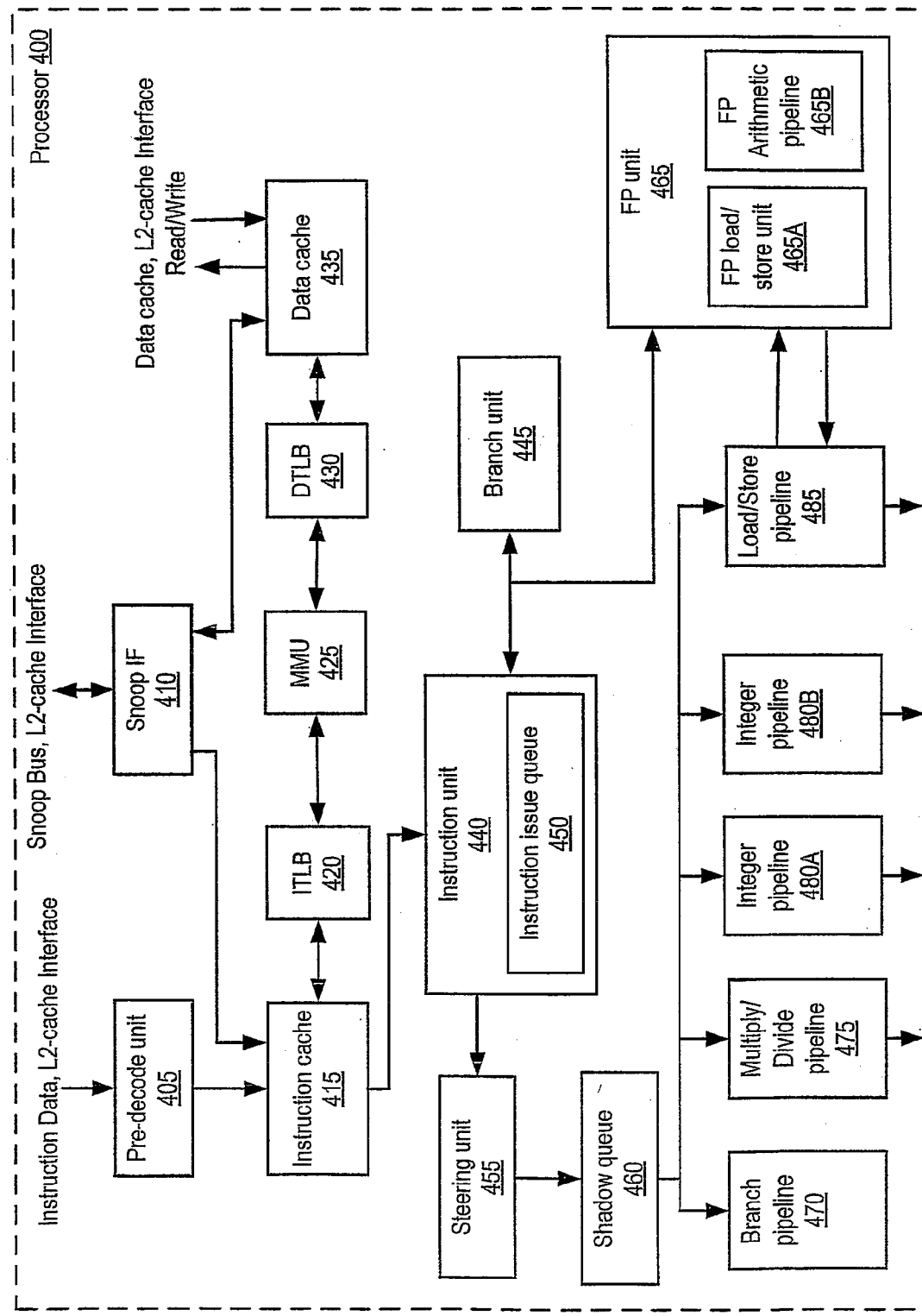
FIG. 4 illustrates an exemplary block diagram of a superscalar processor that includes a steering unit and a shadow queue, according to one or more embodiments.

Turning now to FIG. 4, there is depicted a block diagram representation of a superscalar processor, according to one or more embodiments. As is illustrated, a superscalar processor 400 can include a pre-decode unit 405 coupled to an instruction cache 415 (e.g., a level one cache) that can be coupled to an instruction translate look-aside buffer (ITLB) 420. ITLB 420 can be coupled to a memory management unit (MMU) 425 that can be coupled to a data translate look-aside buffer (DTLB) 430 that can be coupled to a data cache 435 (e.g., a level one cache). In one or more embodiments, instruction cache 415 can include ITLB 420 and/or data cache 435 can include DTLB 430. As illustrated, a snoop interface (IF) 410 can be coupled to instruction cache 415 and data cache 425. In one or more embodiments, snoop interface 410 can be used for sending and/or receiving data between processor 400 and a snoop bus which can be used for sending and/or receiving invalidation operations.

As shown, instruction cache 415 can be coupled to an instruction unit 440 that includes an IIQ 450. Instruction unit 440 can be coupled to a branch unit 445 and a floating point (FP) unit 465 that includes a FP load/store unit 465A and a FP arithmetic pipeline 465B. As illustrated, instruction unit 440 can be coupled to a steering unit 455 that can be coupled to a shadow queue 460. In one or more embodiments, IIQ 450, steering unit 455, and shadow queue 460 can include one or more elements and/or functionalities of respective IIQ 210, steering unit 250, and shadow queue 270. As illustrated, shadow queue 460 can be coupled to a branch pipeline 470, a multiply/divide pipeline 475, integer pipelines 480A and 480B, and load/store pipeline 485 which can be coupled to FP unit 465. In one or more embodiments, integer pipelines 480A and 480B can include one or more functionalities of respective pipelines 240PI and 240PJ.

Figure 5:
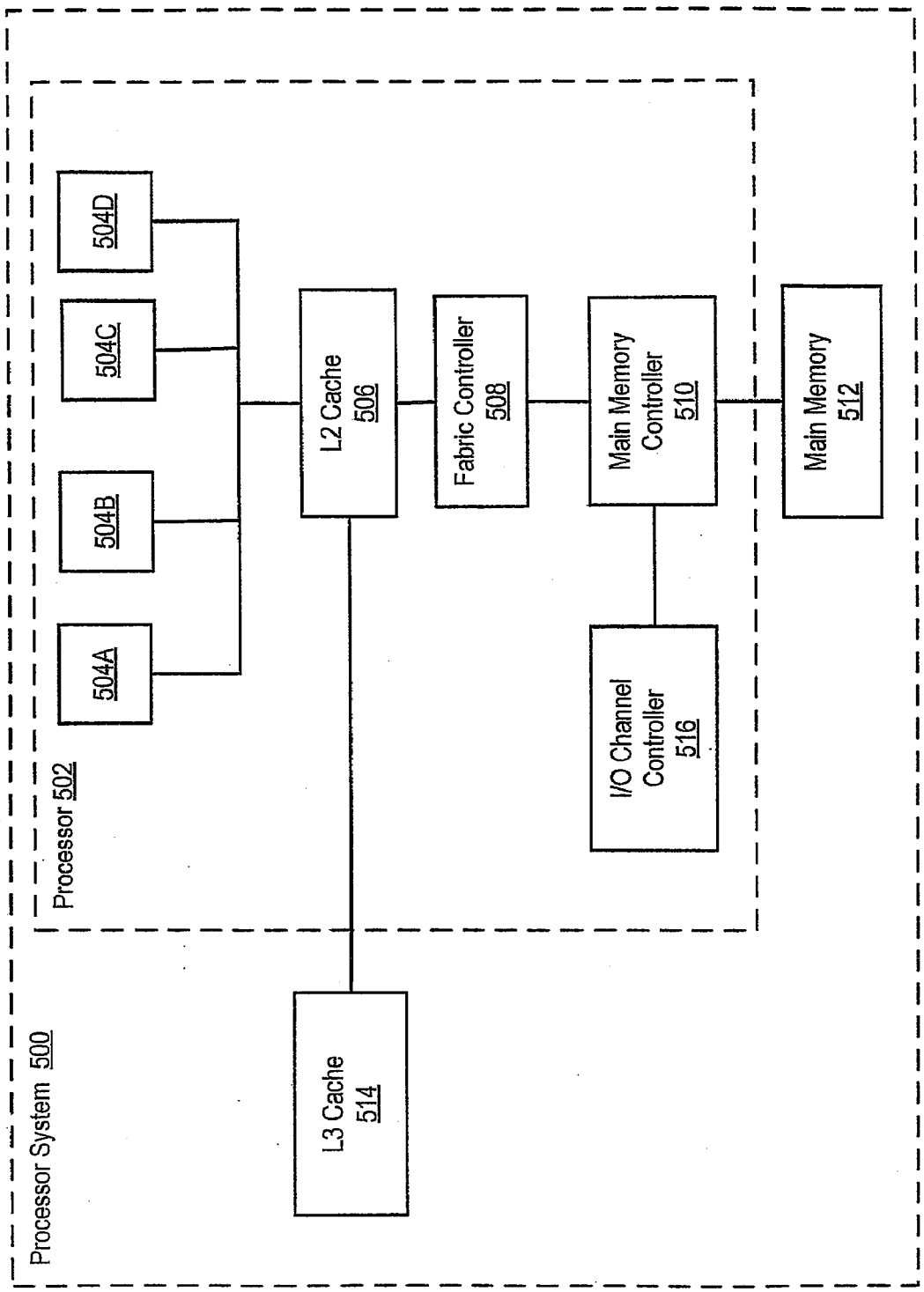
FIG. 5 illustrates an exemplary block diagram of a processor system that includes at least one processor as illustrated in FIGS. 2 and/or 4, according to one or more embodiments.

Turning now to FIG. 5, there is depicted a block diagram representation of a processor system 500. As is illustrated, processor system 500 includes at least one chip-level multi-processor (CMP) 502 (only one of which is illustrated in FIG. 5), each of which includes one or more processors 504A-504D (e.g., cores). Each of processors 504A-504D can include logic/functionality described with reference to processor 200 and/or processor 400. In one or more embodiments, CMP 502 can correspond to a node (or a portion of a node) of a high performance computing (HPC) cluster.

Processors 504A-504D can, for example, operate in a simultaneous multithreading (SMT) mode or a single thread (ST) mode. When processors 504A-504D operate in the SMT mode, processors 504A-504D can employ multiple separate instruction fetch address registers to store program counters for multiple threads. In one or more embodiments, each of processors 504A-504D include a first level (L1) cache memory (not separately shown in FIG. 5) that is coupled to a shared second level (L2) cache memory (cache) 506, which is coupled to a shared third level (L3) cache 514 and a fabric controller 508.

As is illustrated, fabric controller 508 is coupled to a memory controller (e.g., included in a Northbridge) 510, which is coupled to a memory subsystem 512. For example, memory subsystem 512 can provide storage where data and/or processor instructions/code can be stored and/or retrieved. In some embodiments, memory subsystem 512 can include a random access memory and/or computer system memory such as DRAM, SRAM, EDO RAM, Rambus RAM, NVRAM, EPROM, EEPROM, flash memory, etc. Memory subsystem 512 can include other types of memory as well, or combinations thereof. Memory subsystem 512 includes an application appropriate amount of volatile and non-volatile memory.

In one or more embodiments, fabric controller 508 can be omitted and, in this case, the L2 cache 506 can be directly connected to main memory controller 510. Fabric controller 508, when implemented, can facilitate communication between different CMPs and between processors 504A-504D and memory subsystem 512 and can function as in interface in this manner.

It should be appreciated that the various techniques disclosed herein are equally applicable to systems that employ separate L2 caches for each of processors 504A-504D, as well as systems that employ separate L2 and L3 caches for each of processors 504A-504D. Each of the L1, L2, and L3 caches can be combined instruction and data caches or correspond to separate instruction and data caches. As is shown in FIG. 5, main memory controller 510 can also coupled to an I/O channel controller (e.g., included in a Southbridge) 516.

In one or more embodiments, I/O channel controller 516 can provide connectivity and control for one or more input devices and/or one or more output devices. In one example, the one or more input devices can include a pointing device (e.g., mouse) and/or a keyboard, among others. In another example, the one or more output devices can include a display, among others. Additionally, a multimedia drive (e.g., compact disk read/write (CDRW), digital video disk (DVD) drive, etc.) and/or an USB (universal serial bus) port can be coupled to I/O channel controller 516. The multimedia drive and the USB port enable insertion of a removable storage device (e.g., optical disk, "thumb" drive, etc.) on which data/instructions/code can be stored and/or from which data/instructions/code can be retrieved. Furthermore, I/O channel controller 516 can be coupled to various non-volatile memory such as a magnetic media, e.g., a hard drive, floppy drive, etc., where data/instructions/code can be stored and/or from where data/instructions/code can be retrieved. In one or more embodiments, I/O channel controller 516 can be coupled to a network interface (e.g., a wired network interface, a wireless network interface, etc.) that can be coupled to a network (e.g., a local area network, a wide area network, a public network such as an Internet, etc.).

In the flow charts above, one or more of the methods and/or processes are embodied in a computer readable medium including computer readable code such that a series of steps are performed when the computer readable code is executed (by a processing unit). In some implementations, certain processes of the methods and/or processes are combined, performed simultaneously, concurrently (e.g., scheduled quickly enough in time to appear simultaneous to a person), or in a different order, or perhaps omitted, without deviating from the spirit and scope of the invention. Thus, while the method (s) and/or process(es) are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, process, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", and/or "system." Furthermore, the present invention may take the form of an article of manufacture having a computer program product with a computer-usable storage medium having computer-executable program instructions/code embodied in or on the medium.

As will be further appreciated, the method(s) and/or process(es) in embodiments of the present invention may be implemented using any combination of software, firmware, microcode, and/or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, EPROMs, EEPROMs, etc., thereby making an article of manufacture, in one or more embodiments. The medium may be electronic, magnetic, optical, electromagnetic, infrared, or semiconductor system (or apparatus or device) or a propagation medium. Further, the medium may be any apparatus that may include, store, communicate, propagate, or transport the program for use by or in connection with the execution system, apparatus, or device. The method(s) and/or process(es) disclosed herein may be practiced by combining one or more machine-readable storage devices including the code/logic according to the described embodiment(s) with appropriate processing hardware to execute and/or implement the code/logic included therein. In general, the term computer, computer system, or data processing system can be broadly defined to encompass any device having a processor (or processing unit) which executes instructions/code from a memory medium.

While the invention has been described with reference to exemplary embodiments, it will be understood by those skilled in the art that various changes may be made and equivalents may be substituted for elements thereof without departing from the scope of the invention. In addition, modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, use of the terms first, second, etc. can denote an order if specified, or the terms first, second, etc. can be used to distinguish one element from another without an ordered imposed.

What is claimed is:

1. A method for operating a superscalar processor, the method comprising:
    at a steering unit coupled between a first instruction issue queue and a second instruction issue queue of the superscalar processor:
        receiving at least first, second and third instructions of a plurality of ordered instructions that pass into instruction issue queue entries of the first instruction issue queue;
        determining that the first instruction and the second instruction of the plurality of ordered instructions are non-branching instructions, wherein the second instruction is subsequent to the first instruction;
        storing the first instruction and the second instruction in two non-branching instruction issue queue entries of the second instruction issue queue;
        determining whether or not the third instruction is a branch instruction, wherein the third instruction is subsequent to the second instruction;
        if the third instruction is a branch instruction, storing the third instruction in a branch entry of the second instruction issue queue; and
        if the third instruction is not a branch instruction, storing a no operation (NOP) instruction in the branch entry of the second instruction issue queue.

2. The method of claim 1, further comprising:
    sending each instruction stored in each of the first entry and the second entry of the second instruction issue queue to a non-branch execution pipeline of a plurality of non-branch execution pipelines of the superscalar processor; and
    sending the instruction stored in the branch entry of the second instruction issue queue to a branch execution pipeline of the superscalar processor.

3. The method of claim 2, wherein at least one execution pipeline of the plurality of non-branch execution pipelines is an integer execution pipeline.

4. The method of claim 2, wherein at least one execution pipeline of the plurality of non-branch execution pipelines is a floating-point execution pipeline.

5. The method of claim 2, wherein a first execution pipeline and a second execution pipeline of the plurality of non-branch execution pipelines are symmetric.

6. The method of claim 1, further comprising:
    determining that a hazard exists between the instructions stored in the two non-branching instruction issue queue entries of the second instruction issue queue; and
    storing the NOP instruction in a non-branching instruction issue queue entry of the second instruction issue queue that includes the second instruction.

7. The method of claim 6, wherein the steering unit performs said determining that the hazard exists.

8. A superscalar processor, comprising:
   a first instruction issue queue including a plurality of instruction issue queue entries;
   a second instruction issue queue including a plurality of instruction issue queue entries having temporary storage locations for instructions yet to be issued; and
   a plurality of execution pipelines coupled to the second instruction issue queue and including at least a branch execution pipeline and at least two non-branch execution pipelines;
   a steering unit coupled between the first instruction issue queue and the second instruction issue queue, wherein the steering unit includes logic for performing the functions of:
      receiving a plurality of ordered instructions that pass into the plurality of instruction issue queue entries of the first instruction issue queue;
      determining that at least a first instruction and a second instruction of the plurality of ordered instructions are non-branching instructions, wherein the second instruction is subsequent to the first instruction;
      storing the first instruction and the second instruction in two non-branching instruction issue queue entries of the second instruction issue queue;
      determining whether or not a third instruction of the plurality of ordered instructions is a branch instruction, wherein the third instruction is subsequent to the second instruction;
      if the third instruction is a branch instruction, storing the third instruction in a branch entry of the second instruction issue queue; and
      if the third instruction is not a branch instruction, storing a no operation (NOP) instruction in the branch entry of the second instruction issue queue.

9. The superscalar processor of claim 8, wherein the superscalar processor includes logic for performing the functions of:
   sending each instruction stored in each of the first entry and the second entry of the second instruction issue queue to a non-branch execution pipeline of the at least two non-branch execution pipelines; and
   sending the instruction stored in the branch entry of the second instruction issue queue to the at least the branch execution pipeline.

10. The superscalar processor of claim 9, wherein at least one execution pipeline of the at least two non-branch execution pipelines is an integer execution pipeline.

11. The superscalar processor of claim 9, wherein at least one execution pipeline of the at least two non-branch execution pipelines is a floating-point execution pipeline.

12. The superscalar processor of claim 9, wherein a first execution pipeline and a second execution pipeline of the at least two non-branch execution pipelines are symmetric.

13. The superscalar processor of claim 8, wherein the steering unit further includes logic for performing the functions of:
   determining that a hazard exists between the instructions stored in the two non-branching instruction issue queue entries of the second instruction issue queue; and
   storing the NOP instruction in a non-branching instruction issue queue entry of the second instruction issue queue that includes the second instruction.

14. A processor system, comprising:
   a memory; and
   at least one superscalar processor coupled to the memory, wherein the at least one superscalar processor includes:
      a first instruction issue queue including a plurality of instruction issue queue entries;
      a second instruction issue queue including a plurality of instruction issue queue entries having temporary storage locations for instructions yet to be issued; and
      a plurality of execution pipelines coupled to the second instruction issue queue and including at least a branch execution pipeline and at least two non-branch execution pipelines;
      a steering unit coupled between the first instruction issue queue and the second instruction issue queue, wherein the steering unit includes logic for performing the functions of:
         receiving the plurality of ordered instructions that pass into the plurality of instruction issue queue entries of the first instruction issue queue;
         determining that at least a first instruction and a second instruction of the plurality of ordered instructions are non-branching instructions, wherein the second instruction is subsequent to the first instruction;
         storing the first instruction and the second instruction in two non-branching instruction issue queue entries of the second instruction issue queue;
         determining whether or not a third instruction of the plurality of ordered instructions is a branch instruction, wherein the third instruction is subsequent to the second instruction;
         if the third instruction is a branch instruction, storing the third instruction in a branch entry of the second instruction issue queue; and
         if the third instruction is not a branch instruction, storing a no operation (NOP) instruction in the branch entry of the second instruction issue queue.

15. The processor system of claim 14, wherein the at least one superscalar processor further includes logic for performing the functions of:
   sending each instruction stored in each of the first entry and the second entry of the second instruction issue queue to a non-branch execution pipeline of the at least two non-branch execution pipelines; and
   sending the instruction stored in the branch entry of the second instruction issue queue to the at least the branch execution pipeline.

16. The processor system of claim 15, wherein at least one execution pipeline of the at least two non-branch execution pipelines is an integer execution pipeline.

17. The processor system of claim 15, wherein at least one execution pipeline of the at least two non-branch execution pipelines is a floating-point execution pipeline.

18. The processor system of claim 15, wherein a first execution pipeline and a second execution pipeline of the at least two non-branch execution pipelines are symmetric.

19. The processor system of claim 15, wherein the steering unit further includes logic for performing the functions of:
   determining that a hazard exists between the instructions stored in the two non-branching instruction issue queue entries of the second instruction issue queue; and
   storing the NOP instruction in a non-branching instruction issue queue entry of the second instruction issue queue that includes the second instruction.

\* \* \* \* \*